United States Patent
Reynier et al.

(10) Patent No.: US 9,246,198 B2
(45) Date of Patent: Jan. 26, 2016

(54) METHOD FOR DETERMINING WHEN A LI-ION CELL COMPRISING A NEGATIVE ELECTRODE MADE OF AN ALLOY IS FULLY CHARGED, ASSOCIATED CELL AND BATTERY

(75) Inventors: Yvan Reynier, Saint Egreve (FR); Willy Porcher, Avrille (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 87 days.

(21) Appl. No.: 14/004,956

(22) PCT Filed: Mar. 16, 2012

(86) PCT No.: PCT/EP2012/054632
§ 371 (c)(1),
(2), (4) Date: Sep. 13, 2013

(87) PCT Pub. No.: WO2012/126817
PCT Pub. Date: Sep. 27, 2012

(65) Prior Publication Data
US 2014/0004398 A1    Jan. 2, 2014

(30) Foreign Application Priority Data
Mar. 18, 2011 (FR) ...................................... 11 52264

(51) Int. Cl.
*H01M 10/48* (2006.01)
*H01M 4/134* (2010.01)
*H01M 10/0525* (2010.01)
*H01M 10/058* (2010.01)
*H01M 4/485* (2010.01)
(Continued)

(52) U.S. Cl.
CPC .............. *H01M 10/48* (2013.01); *H01M 4/134* (2013.01); *H01M 10/058* (2013.01); *H01M 10/0525* (2013.01); *H01M 10/482* (2013.01); *H01M 4/131* (2013.01); *Y02E 60/122* (2013.01)

(58) Field of Classification Search
None
See application file for complete search history.

(56) References Cited

U.S. PATENT DOCUMENTS

| 4,840,251 A | 6/1989 | Murase |
| 5,438,249 A | 8/1995 | Chang et al. |

(Continued)

FOREIGN PATENT DOCUMENTS

| EP | 1538725 A1 | 6/2005 |
| JP | 59172218 A | 9/1984 |

(Continued)

OTHER PUBLICATIONS

Linden et al. "Handbook of Batteries", 3$^{rd}$ ed. (2002), Chapter 35—Lithium-ion batteries, pp. 35.1-35.94.*

(Continued)

*Primary Examiner* — Gregg Cantelmo
(74) *Attorney, Agent, or Firm* — Pearne & Gordon LLP

(57) ABSTRACT

The invention relates to a method for determining the end-of-charging condition of a lithium-ion accumulator with a negative electrode formed with at least one alloy, according to which a surface pressure with a determined force from the external portion of the accumulator (A) against an element (2, 2', 3) is detected, the surface pressure being generated by the thickness increase due to ion insertion at the negative electrode and thereby defining the end-of-charging condition.

27 Claims, 4 Drawing Sheets

Figure 1:
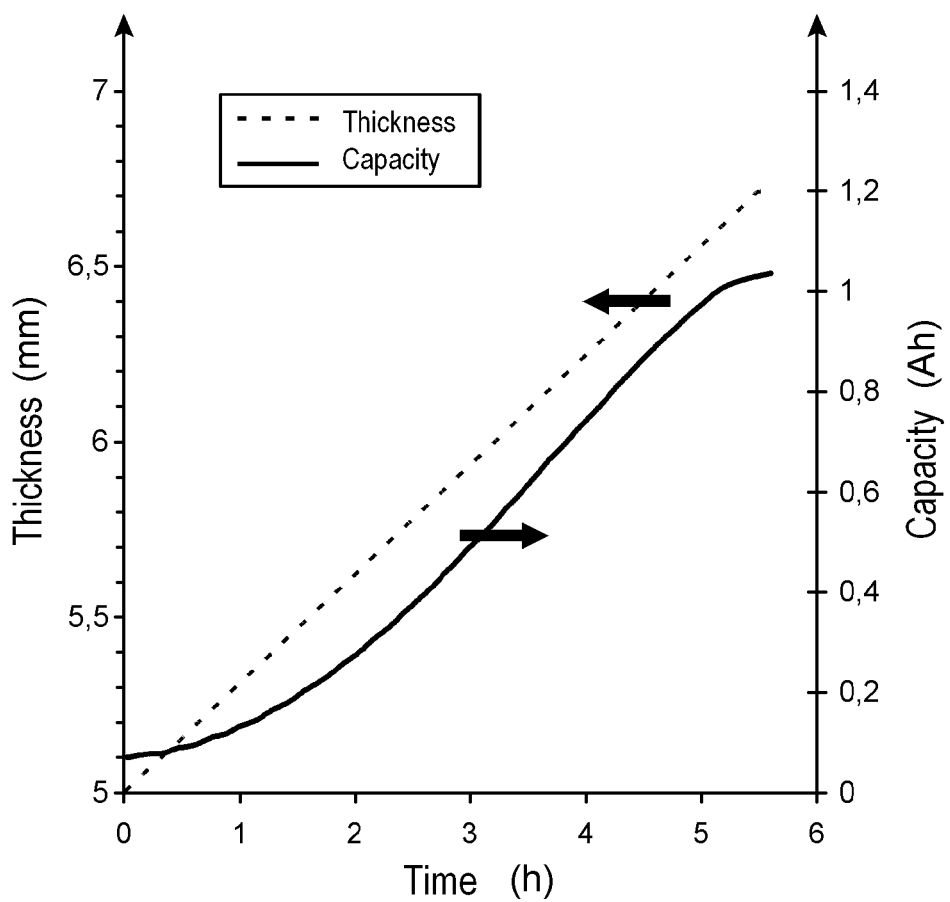

(51) Int. Cl.
  *H01M 4/505* (2010.01)
  *H01M 4/52* (2010.01)
  *H01M 4/525* (2010.01)
  *H01M 4/58* (2010.01)
  *H01M 4/587* (2010.01)
  *H01M 4/131* (2010.01)

(56) References Cited

U.S. PATENT DOCUMENTS

| | | | |
|---|---|---|---|
| 5,569,556 A * | 10/1996 | Bohmer | 429/91 |
| 6,177,799 B1 * | 1/2001 | Martineau et al. | 324/425 |
| 6,407,553 B1 | 6/2002 | Anderson et al. | |
| 2004/0247994 A1 * | 12/2004 | Masuda et al. | 429/66 |
| 2006/0246345 A1 * | 11/2006 | Yoon et al. | 429/62 |
| 2007/0054157 A1 * | 3/2007 | Ryu et al. | 429/7 |
| 2010/0121591 A1 | 5/2010 | Hall | |
| 2011/0033735 A1 | 2/2011 | Kinoshita et al. | |
| 2012/0176140 A1 * | 7/2012 | Kitsuani et al. | 324/433 |

FOREIGN PATENT DOCUMENTS

| | | |
|---|---|---|
| JP | 61006812 A | 1/1986 |
| JP | 2007128762 A * | 5/2007 |
| JP | 2010040324 A | 2/2010 |
| WO | 2010/064392 A1 | 6/2010 |
| WO | 2011/012570 A1 | 2/2011 |

OTHER PUBLICATIONS

V. Pop et al. "State-of-the-art of battery state-of-charge determination" Institute of Physics Publishing, Measurement Science and Technology, 16 (2005), R93-R110.

French Preliminary Search Report for FR-1053510 dated Dec. 15, 2010.

Winter, Martin et. al, "Insertion Electrode Materials for Rechargeable Lithium Batteries", Advanced Materials, Wiley Vch Verlag. DE. vol. 10, No. 10.

International Search Report for PCT/EP2012/054632 dated Jun. 28, 2012.

* cited by examiner

METHOD FOR DETERMINING WHEN A LI-ION CELL COMPRISING A NEGATIVE ELECTRODE MADE OF AN ALLOY IS FULLY CHARGED, ASSOCIATED CELL AND BATTERY

TECHNICAL FIELD

The invention relates to a method for determining the end-of-charging condition of a lithium-ion accumulator with a negative electrode formed with at least one alloy.

The invention is directed to providing a simple and reliable indicator for the end-of-charging condition of this type of lithium-ion (abbreviated as Li-ion) accumulator.

The invention also relates to a device comprising a lithium-ion accumulator of this type as well as to an assembly of several accumulators of this type currently called a « battery pack », for applying the method.

PRIOR ART

A negative electrode of a lithium-ion accumulator may be formed with a single alloy, or with a mixture of alloys, or with a mixture of alloy(s) and of other material(s) for lithium insertion (graphite, in the synthetic or natural form, $Li_4Ti_5O_{12}$, $TiO_2$ . . . ). This negative electrode may also contain electron conducting additives as well as polymeric additives which give it suitable mechanical properties and electrochemical performances for the lithium-ion battery application or for its application method.

During its electrochemical alloying with the lithium ion $Li^+$, the negative electrode formed with at least one alloy is subject to a significant increase in its crystallographic lattice parameter. This significant increase in the crystallographic lattice parameter of the alloy cannot be absorbed by the intrinsic porosity of the negative electrode. In other words, during successive charging cycles, the negative electrode is also subject to increases in dimensions, mainly in its thickness. Gradually, given that the whole of the constituents of a Li-ion battery, i.e. separator, electrode, collectors, and packaging, have low elasticity, the significant increase in the crystallographic lattice parameter of the alloy induces stress on the packaging or deformation of the latter depending on its stiffness.

The expansion of the alloy, during charging of a Li-ion accumulator with a negative electrode formed with at least one alloy, may be harmful to the actual accumulator, to the packaging which contains it, to the assembly of several Li-ion accumulators (Li-ion battery pack) or to the system integrating the Li-ion battery or the Li-ion battery pack if the deformation of the packaging, the pressure inside the latter or the pressure exerted by the latter on any other part is not under control.

Usually, the conventional method for obtaining an indicator of the end-of-charging condition for a lithium-ion accumulator is to track the charging condition from its voltage and/or the current. More or less complex methods exist and notably take into account the ohmic resistance and/or its temperature. Mention may be made here of patent application US 2010/0121591. These methods do not practically control the pressure or the exerted deformation mentioned above.

Figure 5:
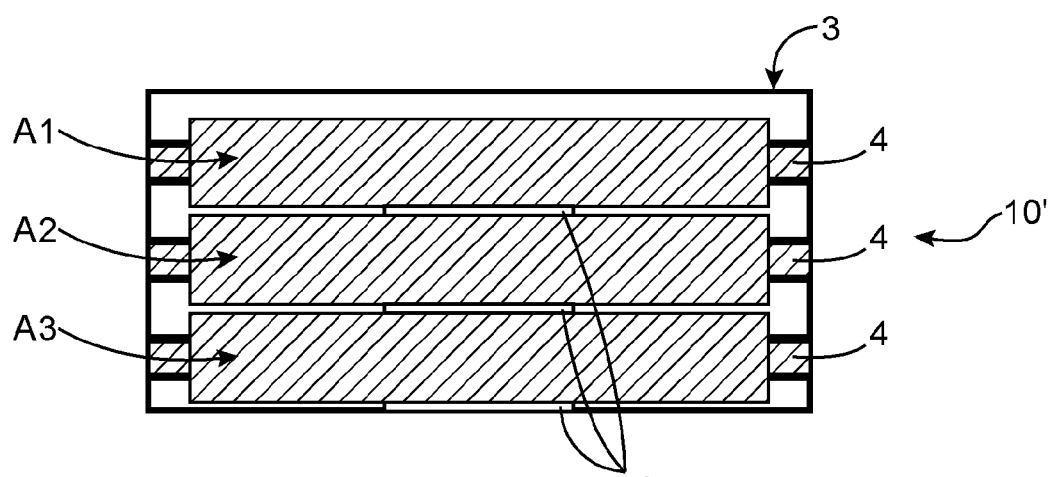
Figure 6:
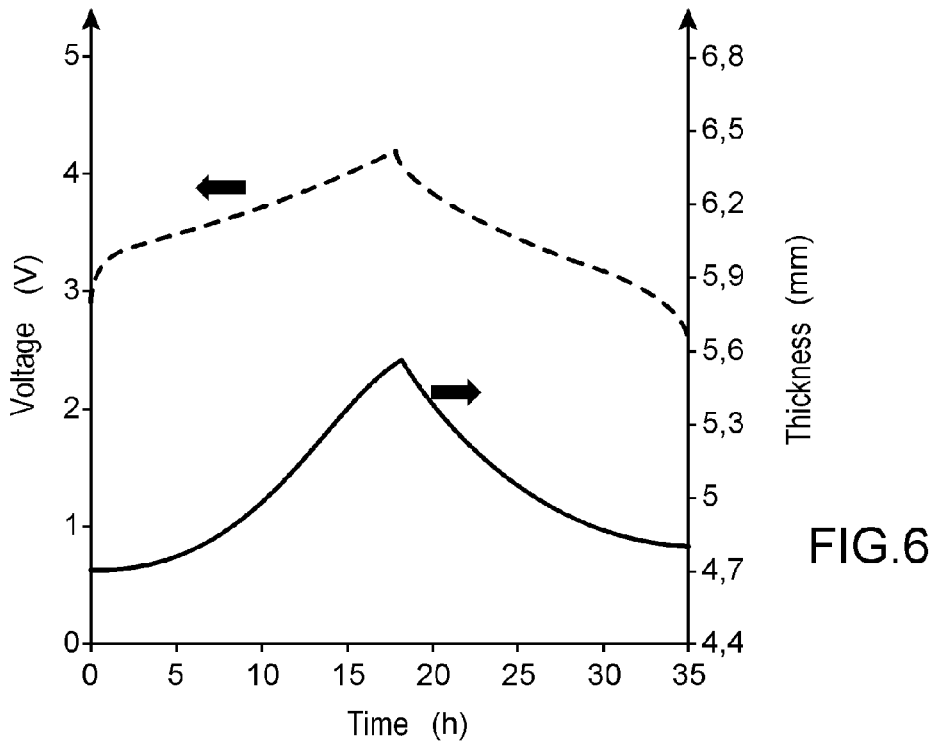

Continuous measurement of the physical displacement of the polymeric flexible packaging of the Li ion accumulator or the pressure increase of the latter against an element, is known from U.S. Pat. No. 5,438,249 (hereinafter referred to as the '249 patent), this change in the displacement or pressure increase being generated by the increase in thickness due to ion insertion at the negative electrode. Two embodiments are provided from the '249 patent:

the one of FIG. 5 of the '249 patent according to which a polymeric stack of Li ion accumulators 40 is laid out between two stiff plates 41, 43 held together by a spring and between which a linear displacement gauge 45 is connected allowing continuous detection of the displacement, and the one of FIG. 6 of the '249 patent according to which a stack of the same type 50 and a flexible pocket 51 permanently bearing against the stack 50 are laid out in a stiff housing 53; the flexible pocket 50 is filled with a liquid and is extended with a tube 55 which extends on the outside of the stiff housing 53. The pressure increase generates a rise of the liquid level in the tube 55, which allows continuous detection.

In the '249 patent, detectors used 45, 50, 55 necessarily have to be very accurate since the thickness increases are very small, of the order of a few micrometers. Further, these detectors are not simple to apply. Finally, the detection of the thickness increase is only global, i.e. it can only be accomplished for the assembly of the stack 40 or 50 and not individually for each accumulator 30 forming said stack.

The object of the invention is then to propose a solution which is simple to apply and reliable, allowing determination of the end-of-charging condition of an Li-ion accumulator with a negative electrode formed with at least one alloy, in order to avoid any deterioration of the accumulator, of its packaging, of an Li-ion battery pack with several accumulators of this type, or of a complete Li-ion system notably comprising an Li-ion battery pack and integrated electronic components.

DISCUSSION OF THE INVENTION

To do this, the object of the invention is a method for determining the end-of-charging condition of a lithium-ion accumulator with a negative electrode formed with at least one alloy, according to which a surface pressure with a determined force of the external portion of the accumulator against an element is detected, the surface pressure being generated by the thickness increase due to ion insertion at the negative electrode and thus defining the end-of-charging condition.

The inventors first of all showed that the thickness of a negative electrode formed with at least one alloy of a lithium-ion accumulator monotonously changed over time like the capacity of the accumulator over time during charging with a constant current completed by a step with an imposed potential, as this is apparent from FIG. 1. They drew the conclusion therefrom that the charging of such an accumulator may be stopped as soon as the volume expansion, mainly along the thickness of the negative electrode alloy had reached a threshold. Thus, they had the idea of detecting this threshold of thickness increase of the negative electrode by the volume expansion of the alloy(s) by producing surface pressure with another element operating as a mechanical abutment. Thus, according to the invention by proposing a mechanical abutment for the accumulator, the thickness of which increases during the charging, an end-of-charging condition is defined which is simple to apply and reliable. Further, the method according to the invention may be used as an addition to already existing methods for tracking the charging condition, which continuously measure the latter. Here, by means of the invention, it is ensured that no damage is induced on an accumulator or its environment during a charging step.

Advantageously, a determined force of the surface pressure, at least equal to 50 N, is detected.

Still advantageously, the thickness increase generating the surface pressure is at least equal to 0.1 mm.

The invention also relates to a device for applying the method described earlier, comprising:

- at least one lithium-ion accumulator, comprising at least one electrochemical cell consisting of at least one negative electrode with lithium insertion, formed with at least one alloy and a cathode on either side of an electrolyte, and a packaging laid out for containing the electrochemical cell(s) with a seal,
- a stiff casing under the pressure exerted by at least one accumulator, generated by the thickness increase due to the ion insertion at the negative electrode,
- at least one means for mechanically attaching the accumulator, during the thickness increase due to the ion insertion at the negative electrode, allowing the accumulator to be held in place in the stiff casing,
- at least one force sensor attached to the external portion of the packaging or on one of the inner faces of the stiff casing, said force sensor being capable of assuming two conditions, one being a so-called discharge condition, in which it is at a distance or bearing on a surface under a respectively determined force of the stiff casing or of the external portion of the packaging, and the other condition, a so-called end-of-charging condition, in which it is bearing upon a surface respectively against the stiff casing or against the external portion of the packaging with the determined force.

It is specified here that during the charging of the accumulator(s), the battery charger is connected to the electric network and therefore the low electric consumption of the force sensor has only very little influence on the charge, strictly speaking, of the accumulator(s) (battery).

It is also specified that:
- for an accumulator with a geometry of the prismatic type, the mechanical holding means is(are) laid out in a plane normal to the main deformation of the accumulator,
- for an accumulator with a geometry of the cylindrical type, the mechanical holding means is(are) laid out in a plane normal to the axis of revolution of the cylinder.

When it is desired to make a so-called « battery pack » assembly, the device may comprise:

- a stack of a plurality of separate lithium-ion accumulators between lateral mechanical supports for holding the accumulator(s) in place within the stack, the accumulator of the bottom being held in place by the mechanical attachment means and the accumulator of the top being separate from the stiff casing by at least one empty space or directly in contact on a force sensor,
- a plurality of force sensors, including at least one force sensor attached to the external portion of the stack of the accumulator of the top of the stack or inside the stiff casing, and at least one force sensor attached to the external portion of the packaging of each accumulator within the stack, each force sensor within the stack being also able to be in a discharge condition, in which it is at a distance or bearing upon a surface under a determined force from the external portion of another accumulator and an end-of-charging condition, in which it is bearing upon a surface against the external portion of the packaging of another accumulator with the determined force.

The invention also relates to a device for applying the method described earlier, comprising:

- at least one lithium-ion accumulator, comprising at least one electrochemical cell consisting of at least one negative electrode with lithium insertion, formed with at least one alloy and a positive electrode separated by a separator impregnated with electrolyte, and a packaging laid out for containing the electrochemical cell(s) with a seal,
- a stiff casing under the pressure exerted by at least one accumulator, generated by the thickness increase due to ion insertion at the negative electrode,
- at least one means for mechanically attaching the accumulator during the thickness increase due to ion insertion at the negative electrode, allowing the accumulator to be held in place in the stiff casing,
- a contactor, the mobile portion of which is attached to the external portion of the packaging of the accumulator and the fixed portion is attached inside the stiff casing, the mobile portion of the contactor being able to move between a position, a so-called discharge position, in which it is at a distance from the fixed portion of the contactor, a so-called end-of-charging position, in which it bears upon a surface against the fixed portion of the contactor with a determined force.

When it is desired to produce a « battery pack » assembly, the device may comprise:

- a stack of a plurality of lithium-ion accumulators separated from each other by lateral mechanical supports for holding the accumulator(s) in place within the stack, the accumulator of the bottom being held in place by the mechanical attachment means and the accumulator of the top being separated from the stiff casing (3) by at least one empty space,
- a plurality of contactors, including at least one contactor with its mobile portion attached to the external portion of the packaging of the accumulator of the top and/or of the bottom of the stack and with its fixed portion attached inside the stiff casing, and at least one contactor with a mobile portion attached to the external portion of the packaging of each accumulator within the stack, each mobile contactor portion within the stack being also able to move between a discharge position, in which it is at a distance from another mobile contactor position attached to the external portion of another accumulator, and an end-of-charging position, in which it bears upon a surface against the other mobile contactor portion attached to the external portion of the packaging of another accumulator with the determined force.

It is specified here that in a « battery pack » according to the invention, the end of charging is reached as soon as one of the contactors closes or one of the force sensors has reached its pressure force determined beforehand, preferably of at least 50 N.

It is also specified that in a « battery pack » according to the invention, suitable means are provided for achieving active balancing among all the accumulators of the « battery pack » so that they all remain in the same charging state during a charging step.

Finally it is specified that when all the accumulators of the stack individually have on either side an empty space, in other words when they are somewhat floating, provision is made for all the lateral mechanical holding means, such as wedges, substantially having the same height among each other.

Thus it is possible by means simple to apply and for which reliability is proven (contactor or force sensor), to detect a threshold deformation value of a negative electrode formed with at least one alloy which should not be exceeded in order to avoid any risk of damage.

The mechanical attachment means between the accumulator and the stiff casing may advantageously be an adhesive. Thus, the mechanical attachment means of the accumulator, the closest to the bottom of the stiff casing may be an adhesive for attaching said accumulator to the latter.

Each negative electrode may be formed with a single alloy (Si, Sn, Al, Sb . . . ), with a mixture of alloy(s) or a mixture of alloy(s) and of other lithium insertion material(s), such as graphite, $Li_4Ti_5O_{12}$, $TiO_2$.

Each positive electrode may be formed with a lamellar oxide, such as $LiMO_2$, with M=Co, Ni, Mn, Al, Mg or a mixture thereof, or with a spinel oxide of general formula $LiM_2O_4$, such as manganese spinel $LiMn_2O_4$ or high voltage spinel $LiMn_{1.5}Ni_{0.5}O_4$, or in material(s) based on phosphate, such as $LiMPO_4$ with M=Co, Ni, Fe, Mn, Mg, B or a mixture thereof, or with over-stoichiometric lamellar oxides of formula $Li_{(1+x)}MO_y$, with M=Ni, Co, Mn, or a mixture thereof wherein $0.5<x<2$ et $2<y<3$.

Each electrolyte ensuring ion conduction between electrodes may be liquid, such as based on carbonates or in the form of a gelled polymer conducting lithium ions or an ionic liquid. Any other stable compound at the contemplated potentials (0 to 5 Volts vs. $Li^+/Li$) and allowing dissolution of a lithium salt, such as usually $LiPF_6$, may also be contemplated.

Each separator ensuring the electric insulation between electrodes consists of a membrane which is porous to the electrolyte which impregnates it, said membrane being based on polymer. Any other electrically insulating and ion conducting constituent for lithium ions may also be contemplated.

SHORT DESCRIPTION OF THE DRAWINGS

Figure 2:
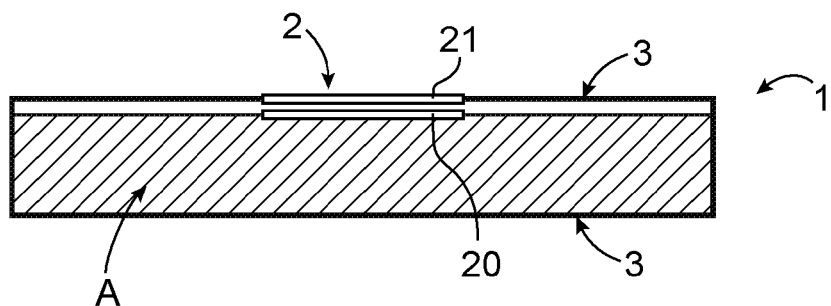
Figure 3:
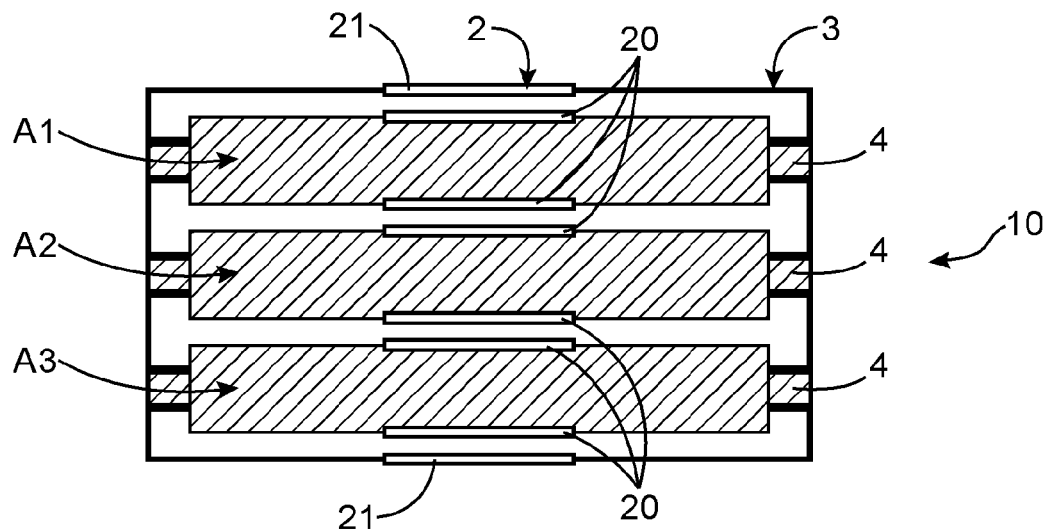
Figure 4:
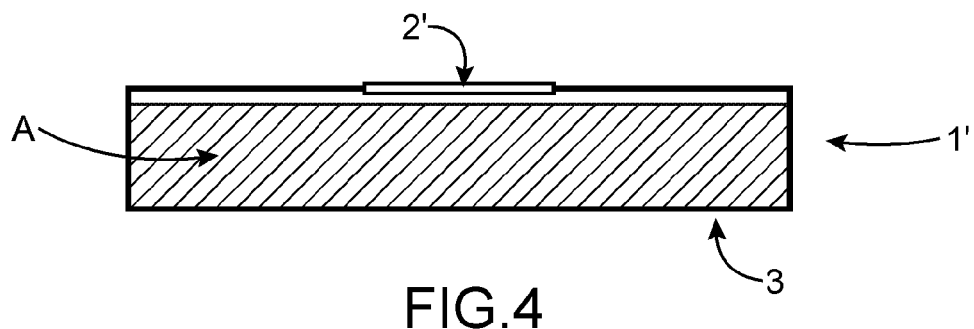
Figure 7A:
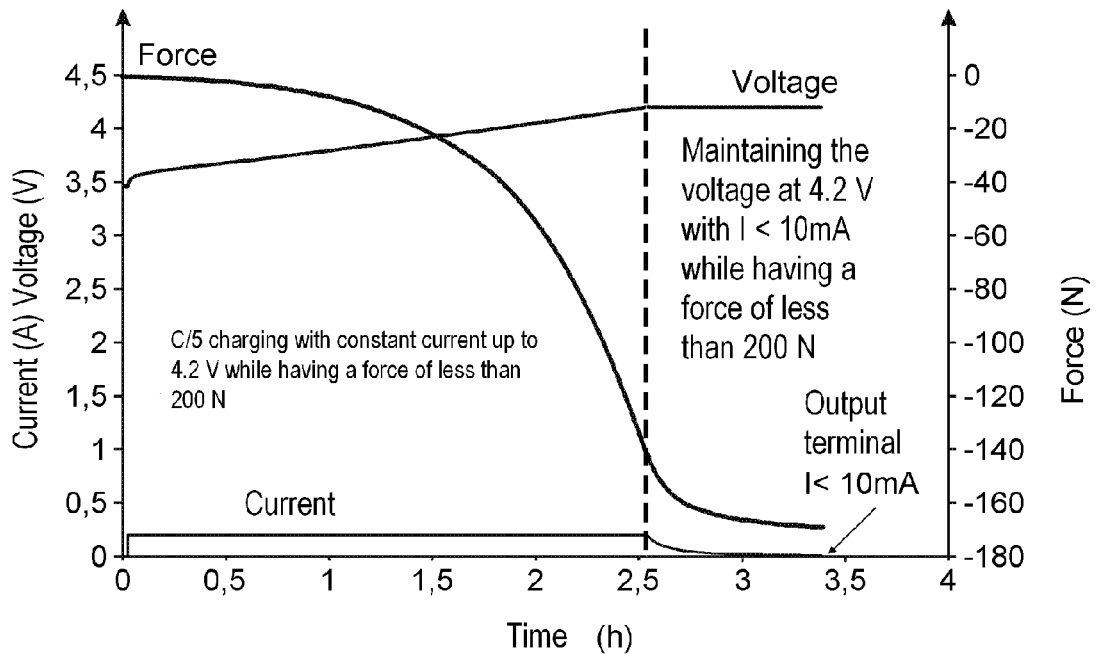
Figure 7B:
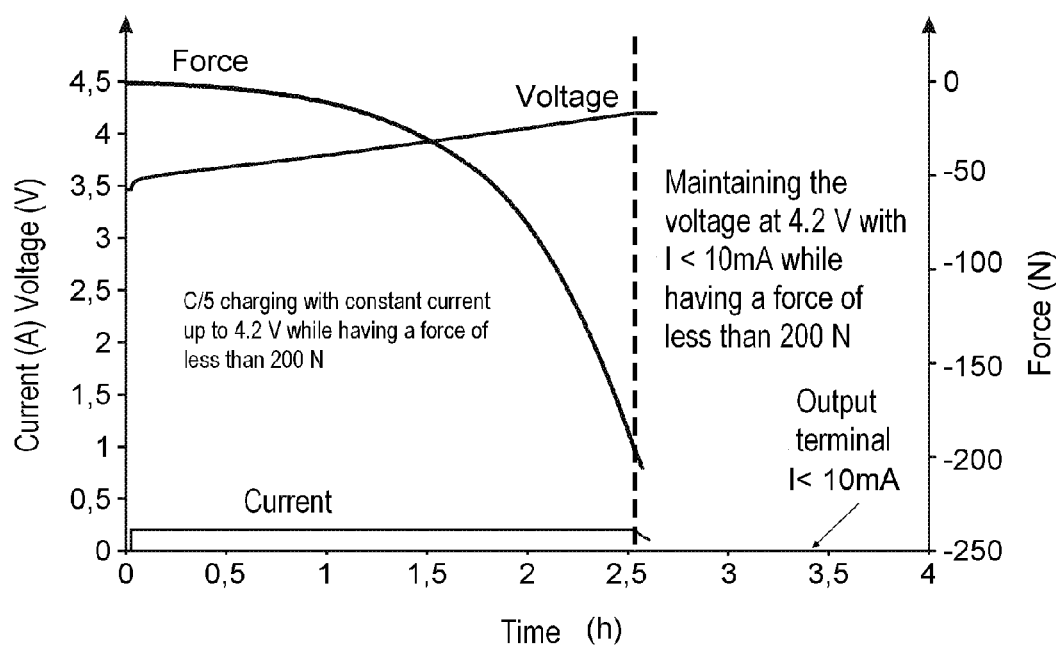

Other features and advantages will become better apparent upon reading the detailed description made hereafter as an illustration and not as a limitation with reference to the following figures wherein:

FIG. 1 shows the time-dependent change in the capacity and in the thickness of a lithium-ion accumulator with a negative electrode formed with at least one alloy versus time during charging with a constant current completed with a constant potential step, FIG. 2 is a schematic sectional view of a device according to a first embodiment of the invention with a single lithium-ion accumulator with a negative electrode formed with at least one alloy, FIG. 3 is a schematic sectional view of a device according to a first embodiment of the invention with a stack of three lithium-ion accumulators with a negative electrode formed with at least one alloy, FIG. 4 is a schematic sectional view of a device according to a second embodiment of the invention with a single lithium-ion accumulator with a negative electrode formed with at least one alloy, FIG. 5 is a schematic sectional view of a device according to a second embodiment of the invention with a stack of three lithium-ion accumulators with a negative electrode formed with at least one alloy, FIG. 6 shows the time-dependent change in the deformation depending on the thickness of a lithium-ion accumulator with a negative electrode formed with at least one alloy versus a charging/discharging cycle over time, FIG. 7A shows the time-dependent change in the stress, in the potential and in the current of a lithium-ion accumulator with a negative electrode formed with at least one alloy, the stress being measured by a force sensor between the accumulator and a nearby fixed element and the charging being stopped as according to the state of the art by detecting a current threshold, FIG. 7B shows the time-dependent change in the stress, the potential and in the current of a lithium-ion accumulator with a negative electrode formed with at least one alloy, the stress being measured by a force sensor between the accumulator and a nearby fixed element and the charging being stopped as according to the invention by detecting a force threshold with the sensor.

DETAILED DISCUSSION OF PARTICULAR EMBODIMENTS

The description of FIG. 1 has already been made in the preamble and will therefore not be further described here.

An exemplary lithium-ion accumulator with a negative electrode formed with at least one alloy according to the invention is now described.

The negative electrode is formed with:
silicon in the form of nanometric or micrometric particles in a proportion comprised between 10 and 98% of the mass, forming an alloy with lithium,
electron conductors in a proportion comprised between 1 and 20% of the mass,
binders in a proportion comprised between 1 and 30% of the mass. This porous negative electrode, the porosity of which is comprised between 15 and 50% of the volume, is deposited on a current collector in copper.

The positive electrode is formed with:
a lithium oxide of the $LiNi_xMn_yCo_zO_2$ type in a proportion comprised between 80 and 98% of the mass,
electron conductors in a proportion comprised between 1 and 10% of the mass,
binders in a proportion comprised between 1 and 10% of the mass. This porous positive electrode, the porosity of which is comprised between 15 and 50% of the volume, is deposited on a current collector in aluminum.

Both of these electrodes (negative electrode and positive electrode) are wound on a prismatic mandrel separated by a separator based on porous polyethylene, with a porosity comprised between 20 and 60% of the volume and with a small thickness typically from 5 to 50 µm.

The wound thickness of the electrochemical core, including both electrodes and the separator is 4.5 mm, including:
about 3 mm of positive electrode and of aluminum collector,
about 1 mm of negative electrode and of copper collector,
about 0.5 mm of separator.

The electrochemical core is packaged with a flexible bag, forming a flexible packaging, which is heat-sealed at the moment of the activation with an electrolyte which is a mixture of carbonate containing a lithium salt, such as for example a mixture of ethylene carbonate and of dimethyl carbonate in a proportion of 1:1 with $LiPF_6$ at a concentration of 1 mol/L.

Thus, a Li-ion accumulator with a negative electrode formed with at least one alloy according to the invention has a thickness of about 4.7 mm, when it is activated.

During charging/discharging cycles, the Li-ion accumulator according to the invention is subject to changes in its thickness because of the low stiffness of the packaging. These thickness changes in the Li-ion accumulator according to the invention were measured from a strain gauge attached on the external portion of the flexible packaging: the measurements are shown in FIG. 6. Thus it may be seen that the thickness may be increased up to about 5.7 mm on the first cycle, which represents an increase by about 21% relatively to the thickness of the activated accumulator.

It is specified that in this FIG. 6, the cycling rate conditions are indicated as equal to C/20, which corresponds to 20 hours required for carrying out charging or discharging.

Thus, in order to determine the end-of-charging condition, it is possible to integrate a contactor or a force sensor into a stiff casing of a single accumulator or of a stack of accumulators in order to avoid that too significant stress appears on the stiff casing.

FIGS. 2 and 4 show the integration respectively of a contactor 2 or of a force sensor 2' into a device 1,1' according to the invention comprising a single lithium-ion accumulator A as defined in the example above. More exactly, the accumulator A is held in place in the stiff casing 3 by adhesive bonding on its face facing the stiff casing and where the deformation, due to the ion insertion at the negative electrode, is a main deformation. The mobile portion 20 of the contactor 2 is attached on the external portion of the flexible packaging of the accumulator A. The fixed portion 21 of the contactor 2 is attached on the internal wall of the stiff casing facing the mobile portion 20. The force sensor 2' is, as for it, attached on the internal wall of the stiff casing 3.

FIGS. 3 and 5 show the integration of respectively a contactor 2 or a force sensor 2' into a device 10,10' according to the invention comprising a stack of three lithium-ion accumulators A1, A2, A3 as defined in the example above. The layout of the accumulators is achieved like for FIGS. 2 and 4, except that lateral mechanical supports 4, laid out in the plane normal to the main deformation, hold in place the accumulator A2 inserted in the stack. The attachment of the contactors 2 and force sensors 2' is also achieved like for FIGS. 2 and 4, except that two mobile portions 20 of contactors or two force sensors 2' are attached on either side of the external portion of the packaging of the accumulator A2 of the center of the stack.

Thus, a force threshold of the contactors 2 or force sensors 2' is defined with respect to considerations based on the acceptable deformation of the stiff casing 3 for use, which here is 200 N. The charging voltage threshold, which is based on electrochemical considerations, is defined to be 4.2 V for charging with a current of less than 10 mA. Both of these end-of-charging indicators are actually complementary as shown in FIGS. 7A and 7B, wherein charging is stopped respectively by the indicator of the end of potential charging like according to the state of the art and/or by the stress end-of-charging indicator 2,2' according to the invention.

In these FIGS. 7A and 7B, the terminology C/n corresponds to the number n of hours required for carrying out a cycle C. The abbreviation CV means that the voltage is set to a specific value while allowing the current to decrease for finishing the charging.

It is specified that within the scope of the invention, the adjustment of a contactor or a force sensor is definitive and does not vary according to the number of charging/discharging cycles of the accumulator(s). An end-of-charging condition is thereby defined as soon as the maximum deformation is reached.

The invention claimed is:

1. A method for determining an end of charging condition of a battery pack assembly, the battery pack assembly comprising a stack of a plurality of lithium ion accumulators, each of the accumulators having a negative electrode formed with at least one alloy and being held in place with a lateral mechanical support laid out in a plane normal to a direction in which a main deformation of the accumulator occurs, the method comprising:
   detecting a surface pressure with a determined force between external portions of facing accumulators, said surface pressure being generated by a thickness increase of one or more of the accumulators, due to ion insertion at its negative electrode and thereby defining the end of charging condition, the thickness increase being detected by contactors or force sensors positioned on an external portion of packaging of the facing accumulators, each of the contactors or force sensors being capable of being in a first state or a second state, the first state corresponding to a discharge state in which the contactor or the force sensor of one of the facing accumulators is at a distance from or bearing upon a surface under the determined force from the external portion of the packaging of another one of the facing accumulators, the second state corresponding to a charge state in which the contactor or the force sensor of the one of the facing accumulators bears upon the surface against the external portion of the packaging of the other one of the facing accumulators with the determined force.

2. The method according to claim 1, according to which the determined force of the surface pressure at least equal to 50 N is detected.

3. The method according to claim 1, according to which the thickness increase generating the surface pressure is at least equal to 0.1 mm.

4. A battery pack assembly, comprising:
   a stack of a plurality of lithium-ion accumulators, each of the accumulators comprising one or more electrochemical cells and packaging, each of the electrochemical cells consisting of at least one negative electrode with lithium insertion formed with at least one alloy, a positive electrode, and a separator impregnated with electrolyte, the packaging being laid out to contain each of the electrochemical cells with a seal, each of the accumulators being held in place with a lateral mechanical support laid out in a plane that is normal to a direction in which a main deformation of the accumulator occurs, or normal to an axis of revolution of a cylinder of the stack, or a combination thereof;
   a casing remaining stiff to minimize deformation under pressure exerted by one or more of the accumulators, the pressure being generated by an increase of thickness of the one or more of the accumulators due to ion insertion at the negative electrodes of the one or more of the accumulators, respectively; and
   a plurality of force sensors comprising at least one first force sensor and at least one second force sensor, the first force sensor being attached to an external portion of the packaging of one of the accumulators of a top or a bottom of the stack or being attached to an inside of the casing, the second force sensor being attached to an external portion of the packaging of each of the accumulators within the stack, the second force sensor being capable of being in a first state and a second state, the first state corresponding to a discharge state in which the second force sensor is at a distance from or bearing upon a surface under a determined force from an external portion of the packaging of another one of the accumulators, the second state corresponding to a charge state in which the second force sensor bears upon the surface against the external portion of the packaging of the other one of the accumulators with the determined force.

5. The battery pack assembly according to claim 4, wherein the accumulator of the top of the stack is separated from the casing by at least one empty space.

6. The battery pack assembly according to claim 4, wherein the accumulator of the bottom of the stack is further held in place by an adhesive.

7. The battery pack assembly according to claim 4, wherein each negative electrode is formed with a single alloy or with a mixture of alloy(s) and of other lithium insertion material(s).

8. The battery pack assembly according to claim 7, wherein each negative electrode is formed of graphite or of $Li_4Ti_5O_{12}$ or of $TiO_2$ or of silicon.

9. The battery pack assembly according to claim 4, wherein each positive electrode is formed with a lamellar oxide or a spinel oxide of general formula $LiM_2O_4$ or in material(s) based on phosphate or over stoichiometric lamellar oxides of formula $Li_{(1+x)}MO_y$ with M=Ni, Co, Mn, or a mixture thereof wherein $0.5<x<2$ and $2<y<3$.

10. The battery pack assembly according to claim 9, wherein each positive electrode is formed with $LiMO_2$, with M=Co, Ni, Mn, Al, Mg or a mixture thereof.

11. The battery pack assembly according to claim 9, wherein each positive electrode is formed with manganese spinel $LiMn_2O_4$ or high voltage spinel $LiMn_{1.5}Ni_{0.5}O_4$.

12. The battery pack assembly according to claim 9, wherein each positive electrode is formed with $LiMPO_4$ with M=Co, Ni, Fe, Mn, Mg, B or a mixture thereof.

13. The battery pack assembly according to claim 4, wherein each electrolyte ensuring ion conduction between the electrodes is in liquid.

14. The battery pack assembly according to claim 13, wherein each electrolyte ensuring ion conduction between the electrodes is based on carbonates or in the form of a gelled polymer conducting lithium ions or of a ionic liquid.

15. The battery pack assembly according to claim 4, wherein each separator ensuring electric insulation between the electrodes consists of a membrane that is based on polymer and porous to the electrolyte that impregnates the membrane.

16. A battery pack assembly, comprising:
a stack of a plurality of lithium-ion accumulators, each of the accumulators comprising one or more electrochemical cells and packaging, each of the electrochemical cells consisting of at least one negative electrode with lithium insertion formed with at least one alloy, a positive electrode, and a separator impregnated with electrolyte, the packaging being laid out to contain each of the electrochemical cells with a seal, each of the accumulators being held in place with a lateral mechanical support laid out in a plane that is normal to a direction in which a main deformation of the accumulator occurs, or normal to an axis of revolution of a cylinder of the stack, or a combination thereof;
a casing remaining stiff to minimize deformation under pressure exerted by one or more of the accumulators, the pressure being generated by an increase of thickness of the one or more of the accumulators due to ion insertion at the negative electrodes of the one or more of the accumulators, respectively; and
a plurality of contactors comprising at least one first contactor and at least one second contactor, the first contactor having a mobile portion and a fixed portion thereof, the mobile portion of the first contactor being attached to an external portion of the packaging of one of the accumulators of a top or a bottom of the stack, the fixed portion of the first contactor being attached to an inside of the casing, the second contactor having a mobile portion attached to an external portion of the packaging of each of the accumulators within the stack, the mobile portion of the second contactor being capable of being in a first state and a second state, the first state corresponding to a discharge state in which the mobile portion of the second contactor is at a distance from a mobile portion of another contactor attached to an external portion of another one of the accumulators, the second state corresponding to a charge state in which the mobile portion of the second contactor bears upon a surface against the mobile portion of the other contactor attached to the external portion of the packaging of the other one of the accumulators with a determined force.

17. The battery pack assembly according to claim 16, wherein the accumulator of the top of the stack is separated from the casing by at least one empty space.

18. The battery pack assembly according to claim 16, wherein the accumulator of the bottom of the stack is further held in place by an adhesive.

19. The battery pack assembly according to claim 16, wherein each negative electrode is formed with a single alloy or with a mixture of alloy(s) and of other lithium insertion material(s).

20. The battery pack assembly according to claim 19, wherein each negative electrode is formed of graphite or of $Li_4Ti_5O_{12}$ or of $TiO_2$ or of silicon.

21. The battery pack assembly according to claim 16, wherein each positive electrode is formed with a lamellar oxide or a spinel oxide of general formula $LiM_2O_4$ or in material(s) based on phosphate or over stoichiometric lamellar oxides of formula $Li_{(1+x)}MO_y$ with M=Ni, Co, Mn, or a mixture thereof wherein $0.5<x<2$ and $2<y<3$.

22. The battery pack assembly according to claim 21, wherein each positive electrode is formed with $LiMO_2$, with M=Co, Ni, Mn, Al, Mg or a mixture thereof.

23. The battery pack assembly according to claim 21, wherein each positive electrode is formed with manganese spinel $LiMn_2O_4$ or high voltage spinel $LiMn_{1.5}Ni_{0.5}O_4$.

24. The battery pack assembly according to claim 21, wherein each positive electrode is formed with $LiMPO_4$ with M=Co, Ni, Fe, Mn, Mg, B or a mixture thereof.

25. The battery pack assembly according to claim 16, wherein each electrolyte ensuring ion conduction between the electrodes is in liquid.

26. The battery pack assembly according to claim 25, wherein each electrolyte ensuring ion conduction between the electrodes is based on carbonates or in the form of a gelled polymer conducting lithium ions or of a ionic liquid.

27. The battery pack assembly according to claim 16, wherein each separator ensuring electric insulation between the electrodes consists of a membrane that is based on polymer and porous to the electrolyte that impregnates the membrane.

* * * * *